April 2, 1968   E. BEXTEN   3,375,944
CONTROL DEVICE FOR BOGIE SUSPENSION OF LOADERS
Filed Jan. 26, 1965
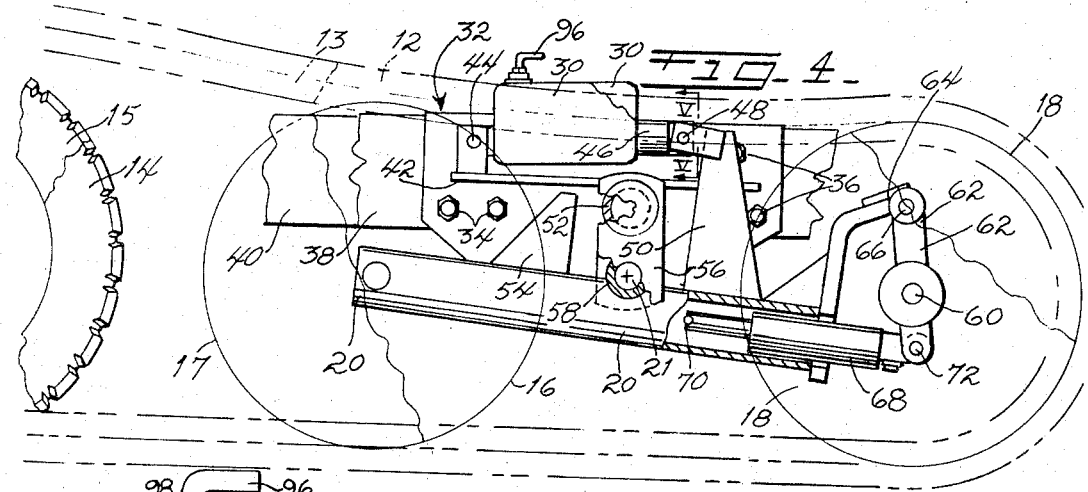
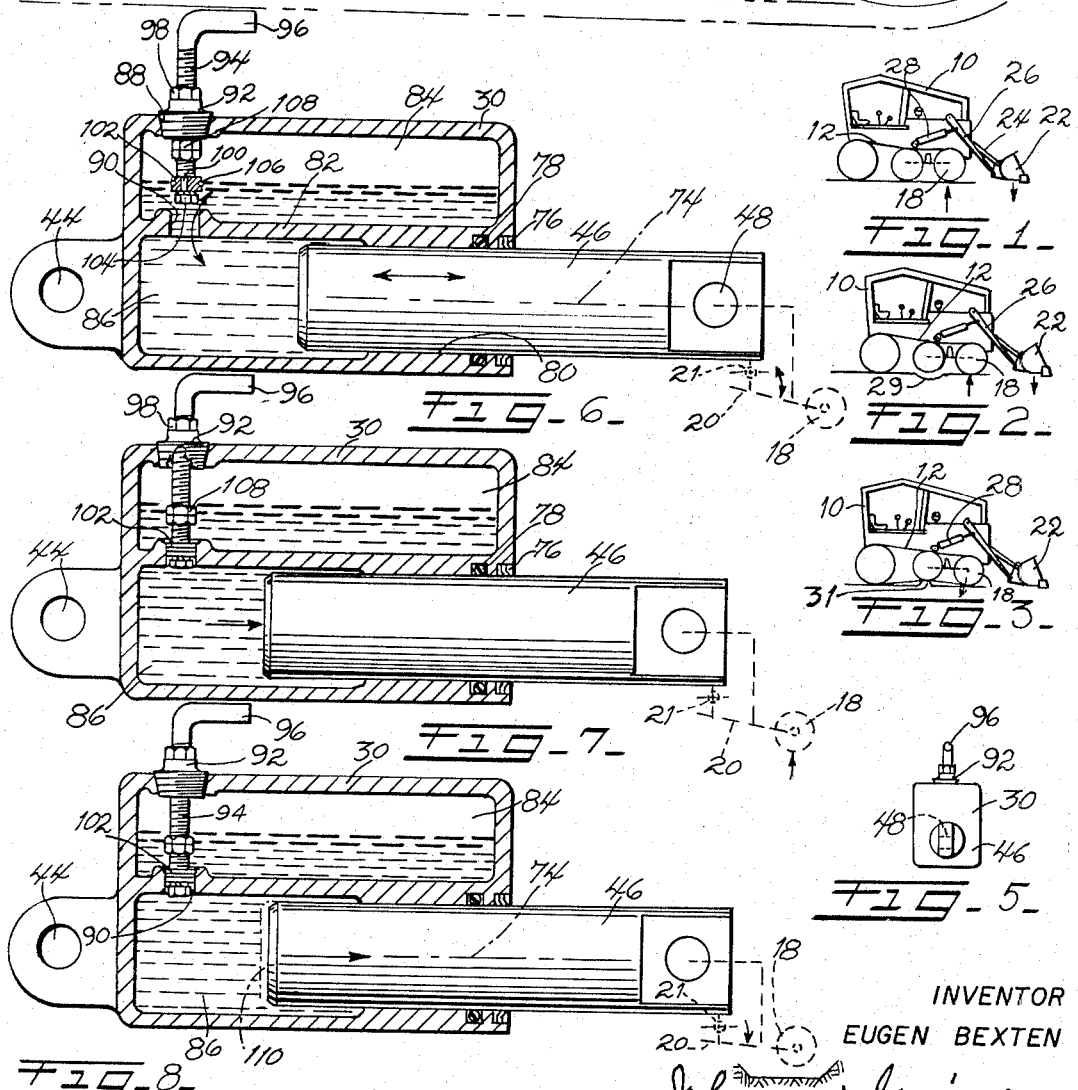
INVENTOR
EUGEN BEXTEN
BY John W. Gaines
ATT'Y

United States Patent Office 3,375,944
Patented Apr. 2, 1968

3,375,944
CONTROL DEVICE FOR BOGIE SUSPENSION OF LOADERS
Eugen Bexten, Hamilton, Ontario, Canada, assignor to International Harvester Company, a corporation of Delaware
Filed Jan. 26, 1965, Ser. No. 428,062
10 Claims. (Cl. 214—140)

This application is related to Bexten U.S. patent applications Ser. No. 387,300 and No. 387,352, each filed Aug. 4, 1964, and the description of the wheel suspensions in those latter applications and other common matter disclosed therein are incorporated herein by reference.

The present invention relates to a controlled suspension system for bucket carrying vehicles, e.g., a front end loader. It more particularly relates to a ride control device for the vehicle, selectively affording a yieldable front suspension providing riding comfort when the bucket is not in use, and affording a single acting or one-way-rigid front suspension during and incident to a loading operation.

Vehicles in general, and especially track type vehicles, are required to operate for entirely different purposes and under contrasting circumstances at different times. In a vehicle traveling at high speed on relatively smooth terrain, a yieldable suspension is desirable for comfort in riding whereas, in the same vehicle during slow operation on rough terrain, rigidity is required and yieldability of the suspension is not only unnecessary but undesirable. Yieldability is especially undesirable in the referred to front end loader vehicles during loading operations, or while engaged in earthmoving or scraping.

Loaders and similar vehicles hitherto have had the difficulty of possessing a suitably comfortable suspension which is too soft for loading work, or have had the difficulty of possessing a suspension solid enough to load, move, and scrape satisfactorily but being otherwise too rough.

My invention materially reduces or largely eliminates the foregoing difficulties as will now be explained. Also, features, objects, and advantages will be particularly pointed out or become apparent when, for a better understanding of the invention, reference is made to the following written description, taken in conjunction with the accompanying drawing which shows a preferred embodiment thereof and in which:

FIGURES 1, 2 and 3 are small scale, side elevational showings of a vehicle, the suspension of which embody the present invention and which are shown in a sequence of views encountering differing formations in the terrain;

FIGURE 4 is a fragmentary view showing the front suspension portion of the vehicle of FIGURE 1, but to enlarged scale;

FIGURE 5 is a front elevational view of an hydraulic control device as viewed in the direction of the arrows V—V of FIGURE 4; and FIGURES 6, 7 and 8 are longitudinal, side elevational views of the control device showing it in cross section to illustrate the internal reaction to a sequence of operating conditions.

More particularly in the drawing, a track laying vehicle 10 known as a skidder is shown equipped for use as a front end loader. The vehicle 10 has a three wheel suspension supporting an endless track assembly 12 at the right side, and a symmetrically identical three wheel suspension supporting a like endless track assembly 13 at the left side.

The wheels are in tandem in each suspension, and include right and left rear drive wheels carrying pneumatic tires 14 and 15 provided with transverse, rubber drive lugs in the tread. The right and left middle or center wheels 16 and 17 are smooth treaded and are of a predetermined small diameter. The right and left frontmost wheels are similarly smooth treaded and are of the predetermined small diameter referred to, each being indicated by the same reference numeral 18.

A pair of substantially identical, longitudinally extending beams, both indicated at 20, is included with one beam in the front portion of each suspension of the vehicle. The beam 20 on the right side carries a front wheel 18 at the front end and the center wheel 16 at the rearwardly extending end. The beam 20 in the suspension on the left side carries a front wheel 18 at the front end and the center wheel 17 at the rearwardly extending end. Each beam 20 is connected at the midportion to a fixed trunnion pin, one of which is shown at 21, so as to allow the associated front and center wheels carried thereby to simultaneously oscillate in opposite directions in a vertical plane.

A front end loader bucket 22 is connected to, and is controlled by, control links 24. The bucket is also connected to a pair of forwardly projecting booms, one of which is shown at 26 and which are located on opposite sides of the front end of the vehicle 10. A pair of hydraulic cylinders, one of which is shown at 28, is disposed one on each side of the vehicle and each is connected to an intermediate point on the boom 26 at that side for supporting the loader bucket 22 in the cantilever fashion indicated in FIGURE 1. It is desirable in the vehicle 10 to react the bucket load, indicated by the downwardly directed arrow, into the ground as close as possible to the loader bucket. Hence, the optimum ground support point would be in line with the upwardly directed arrow into the front wheels 18. This fixed wheel location should not be disturbed in case the middle wheels encounter a rut 29 in the terrain as illustrated in FIGURE 2. Therefore, the beam in that case cannot allow upward oscillation of the front wheels, known as jounce, and the bucket load is reacted or concentrated at the frontmost points with optimum stability.

In FIGURE 3, engagement between the middle wheels and a hump 31 encountered in the terrain creates a temporarily unstable condition because the optimum ground reaction point is momentarily lost when the front wheels lose ground contact. Hence, the beams 20 must be comparatively free to oscillate the front wheels 18 immediately groundwardly to re-establish the foremost contact and resume reacting the bucket load into the ground at the point nearest the bucket.

In FIGURE 4, two identical hydraulic control devices 30 are employed, one in each front suspension to provide the control desiderita just described. More particularly, each device 30 is included in a trunnion assembly, one of which is shown at 32 and which are secured by bolts 34 and 36 to respective laterally spaced longitudinally extending, frame side rails 38 and 40 which support the vehicle 10 at opposite sides. A fore and aft extending horizontal plate 42 in the assembly supports a fixed pair of upstanding brackets, and a pivot pin 44 carried by the brackets forms a pivotal connection to the fixed end of the device 30.

The free end of the device 30 comprises a single acting, forwardly extending plunger or ram 46 which is connected by a pivot pin 48 to a pair of brackets carried by a tall stop plate 50. The tall plate 50 is rigidly secured in an upstanding position on the beam 20, and oscillates therewith into engagement with a tubular crosspiece 52 fixed in the trunnion assembly so as to limit jounce of the adjacent front wheels 18.

A short stop plate 54 disposed on the opposite side of the fixed trunnion pin 21 from the tall plate 50, is rigid with the beam 20 to limit rebound movement of the front wheel 18 and likewise to limit jounce of the middle wheel. A vertically disposed outside plate 56 in the assembly bridges between and rigidly interconnects the crosspiece 52 and the fixed trunnion pin 21 at their outer end. The pin 21 rotatably supports a trunnion sleeve 58 which is fixed to the beam 20 at the upper midportion and which is transverse to, and establishes a fixed transverse axis of oscillation for the beam.

Each of the front wheels 18 has a wheel spindle 60 carried by a wheel supporting suspension arm 62, for fore and aft shift relative to the vehicle so as to adjust tension in the respective track chains 12 and 13. A fixed upstanding arm on the front of each beam 20 carries a pair of spaced apart bearings 64 which are connected by a fixed pivot pin 66 to the fixed upper end of the suspension arm 62. A cylinder 68 which is charged with grease or hydraulic fluid is housed in the beam 20 so as to connect a fixed pivot 70 in the beam 20, which is hollow, and a pivot 72 carried by the freely swinging lower end of the suspension arm 62. The cylinder 68 is extensibly or foreshortenably adjusted by adding or removing the grease or fluid therein, and causes the arm 62 to provide the right load to keep the track chain tight.

In FIGURES 5 and 6, the body of each control device 30 is a generally box shaped casting which recpirocably carries the ram 46 for movement along a longitudinal axis 74. The ram is encircled by a wiper ring 76 and by an O-ring seal 78 which are received in separate grooves within the front end of a cylindrical bore 80 in the lower half of the device 30. A horizontal division wall 82 in the casting is common to an upper reservoir chamber 84, which is usually about half full of hydraulic fluid, and a ram chamber 86 in which the ram 46 works and which is occupied in part by the ram and the balance by hydraulic fluid.

A fill hole 88 in the top of the body of the device 30 communicates with the reservoir chamber 84 and is vertically alingned with a valve controlled port 90 in the common wall 82, the interior surface of the port 90 being a machine finished bore. In the valve open position, the port 90 allows free ingress and egress of reservoir fluid in the direction of the double headed arcuate arrow as the size of the ram chamber 86 is being changed when the ram 46 and the front wheel 18 freely oscillate.

A plug 92 is threaded into the fill hole 88 and has a vertical aperture therethrough which threadedly receives a valve stem 94. A bent handle 96 at the upper end of the stem 94 allows the rider to turn the stem for valve adjustment, and he locks the stem in selected vertical positions by means of an upper nut 98 threaded on the stem and engageable with the outside of the plug 92. At the lower end, the valve stem 94 is of reduced cross section, forming a swivel connection 100 with a disk shaped valve 102 and supporting a nut 104 at the bottom which retains the valve 102 in place. The valve 102 has a horizontal annular groove in the middle, receiving an O-ring 106 which seals the valve in the port 90 in the valve closed position so as to prevent fluid intercommunication in the device 30.

A pair of jamb nuts 108 threaded on the stem 94 engages the inner end of the plug 90 in the valve open position to act as a stop, thus informing the rider that he has moved the valve 102 to its fully withdrawn position relative to the port 90 (FIGURE 6).

In FIGURE 7, the valve 102 is in the lowermost or valve closed position, locked therein by means of the lock nut 98. The chamber 86, therefore, provides pressure in the direction of the arrow therein, forming an hydraulic lock against the inwardly pressing ram 46. The adjacent front wheel 18 cannot move upwardly relative to the vehicle when the wheel strikes a bump as illustrated by the upwardly directed arrow in FIGURE 7. The front wheel 18 is similarly rigidly located against upward movement in both conditions illustrated in FIGURE 1 and in FIGURE 2 foregoing.

In FIGURE 8, the opposite condition creates a different effect, namely, the condition resulting when the vehicle temporarily loses its ground support at the front wheels. Each front wheel 18 could, for example, encounter a rut or it could lose its support due to the condition illustrated in FIGURE 3. In either case, the intensification of load on the middle wheels causes each beam 20 rapidly to oscillate the associated front wheel 18 groundwardly and the ram 46 immediately withdraws outwardly, drawing a vacuum or void 110 in the fluid in the ram chamber 86. Fluid evaporates into the resulting void and the chamber 86 is consequently occupied in part by the ram 46, in part by vapor, and the balance by the fluid. As soon as the terrain permits, the front wheels 18 re-level with respect to the middle wheels, and the ram 46 is restored to its initial condition so as to fill the void and to re-establish the hydraulic lock against movement of the ram 46 farther inwardly.

For purposes of working the vehicle with a front end loader, the driver sets each device 30 in the valve closed position illustrated in FIGURES 7 and 8, thus solidly locating the front wheels 18 against deviation due to jounce. On the other hand, part of the riding comfort is retained when it does not interfere with loading and, in accordance with FIGURE 8, stability during a loading operation is actually improved because the present device allows the front wheels 18 to accommodate downwardly whenever the vehicle loses the ground reaction support that the front wheels normally provide at the extreme front end.

When the tractor is not working with the front end loader, high speed ground travel can be resumed. Hence, the driver adjusts the devices 30 into the valve open position illustrated in FIGURE 6, so that no yieldability is sacrificed and the front suspensions provide full riding comfort.

My device makes the present skidder type loader operate with a highly beneficial but unexpected result. No matter what surface variation is encountered on the ground, any tendency toward rearward shift of the nearest or optimum ground support point with reference to the bucket is self defeating. That is to say, the device readily accommodates and moves when the front wheels try to drop, and the shift of the ground reaction therefrom has a cumulative effect. The bucket load has greater leverage on the middle wheels, whose ground pressure intensifies in a geometric ratio and, by exerting reaction torque in the suspension beam, forces the bogie beam to rotate frontwardly and the front wheels to seek re-established ground contact at a substantially accelerated rate.

It will be appreciated that a twofold objective is accomplished by the suspension described, to wit, it cancels the tendency for the front wheels to yield in jounce when supporting the vehicle normally and it substantially overcomes or cancels the tendency, due to beam and wheel inertia, for the front wheels to dangle when they lose their normal ground support.

What is claimed is:
1. In a front wheel suspension for a track type loader vehicle:
a vehicle frame carrying a longitudinally forwardly cantilevered loader bucket;
a generally longitudinally extending bogie beam mounted to the frame to oscillate about a fixed transverse axis intermediate the ends of the beam;
first and second track wheels rotatably carried at the respective forward and other end of the beam;
an endless track trained over the track wheels;
first and second upstanding stop plates carried by the respective ends of the beam adjacent the first and second track wheels;
stop means on the frame engaged by the first or second stop plate respectively when the first or second wheel undergoes jounce;
control means on the frame comprising a single acting plunger, and a fixed fluid cylinder having plunger receiving means receiving same consisting of a closed cylinder chamber; and
means interconnecting the plunger and one of the plates so that first wheel jounce-force places the single acting plunger in compression, said plunger thereby effectively preventing first wheel jounce motion but drawing a void in the closed cylinder chamber to yield therewith, and to readily move in response to, jounce motion of the second wheel.

2. The invention of claim 1, the control means characterized by:
the fluid cylinder having a fixed, swing connection to said frame, the single acting plunger projecting longitudinally forwardly from the cylinder and having a connection between the projecting end of the plunger and the upstanding end of the first stop plate whereby, when jounce motion of the first wheel forces the first plate into rearward tilt, the single acting plunger is placed in compression.

3. In a loader having end frame means at one end:
working tool means supported on the end frame means in cantilever manner so as to be longitudinally outwardly spaced apart therefrom;
a bogie beam member rotatably carried, at a point intermediate the ends thereof, by the end frame means so as to extend longitudinally;
two tandem wheels oscillatable in opposite directions of wheel jounce by the bogie beam as it rotates, and carried at the respective outwardmost and other end thereof;
single acting ram and cylinder means connected between the end frame means and beam member including ram and reservoir chambers; and
means of fluid communication interconnecting the chambers, including valve means in said communication means for stopping fluid communication to hydraulically lock the ram and to prevent wheel jounce in one direction, said means of communication constituting the sole means of communication with the ram chamber and consisting of a port in a common wall between the chambers, said fluid contacting one end only of said ram,
said ram exerting an inwardwise pressure in the ram chamber due to wheel jounce in said one direction, and drawing a void in the fluid in the chamber in response to wheel jounce in the opposite direction.

4. In a loader having end frame means at one end:
working tool means supported on the end frame means in cantilever manner so as to be longitudinally outwardly spaced apart therefrom;
a bogie beam member rotatably carried, at a point intermediate the ends thereof, by the end frame means so as to extend longitudinally;
two tandem wheels oscillatable, in their respective opposite directions of wheel jounce movement, by the bogie beam as it rotates, and carried at the respective outwardmost and other end thereof;
single acting ram and cylinder means interconnecting the end frame means and beam member including ram and reservoir chambers;
means of fluid communication hydraulically interconnecting the chambers, including valve means in the means of fluid communication for stopping communication to hydraulically lock the ram and prevent wheel jounce in one direction;
a fill plug and a fill hole in the reservoir chamber of said ram and cylinder means;
said means of fluid communication further including a port in a common wall between the chambers and registering with said fill plug and fill hole;
said valve means comprising a valve in the port operable between open valve and closed valve positions; and
a valve operating stem connected to the valve and projecting through the reservoir chamber, through an aperture in the fill plug, and thence to an external point for remote operation of the valve from that point;
said ram exerting an inwardwise pressure in the ram chamber of the cylinder means in response to wheel jounce in said one direction, but drawing a void in the fluid in the ram chamber in response to wheel jounce in the opposite direction.

5. In a vehicle having a forward frame:
work-loadable means supported by the frame so as to carry the load in cantilever manner forwardly thereof;
a pair of wheels arranged with one afront of the other;
a longitudinally disposed bogie beam arranged with the wheels carried by, and disposed one at each of, the respective front and other end of the beam;
a trunnion frame, including a crosspiece, for connecting the beam to the frame to rotate thereupon on a transverse pivotal axis;
front and rear stop plates fixed at respective points on the beam frontwardly and rearwardly of the axis, one engageable with the crosspiece upon sustained upward rotation of the beam at the front and the other engageable with the crosspiece upon sustained downward rotation of the beam at the front;
a plunger and cylinder unit on the vehicle frame having the cylinder fixed at a location on the frame at the rear end of the unit and extending between that location on the frame and the front plate on the beam;
said unit containing working and reservoir chambers having means of fluid intercommunication within the unit; and
valve means in said fluid means for stopping the fluid intercommunication in said unit to hydraulically lock the plunger as it moves in the working chamber and fix the position of the beam;
the plunger of said unit being connected at the front of the unit to said front stop plate, so that upward rotation of the bogie beam at the front places the single acting plunger in compression, said plunger thereby effectively preventing such rotation, but drawing a void in the working chamber to yield therewith and readily move when the bogie beam rotates downwardly at the front.

6. In a vehicle having a forward frame:
work-loadable means supported by the frame so as to carry the load in cantilevered manner forwardly thereof;
a pair of generally tandem wheels;
a longitudinally disposed bogie beam arranged with the wheels carried by, and disposed one at each of, the respective front and other end of the beam;
a trunnion frame, including a crosspiece, for connecting the beam to the frame to rotate with respect to the latter on a transverse axis;

stop plates on the beam disposed one at each side of the transverse axis, and each engageable with the crosspiece when the bogie beam pivots in a respective direction to limit the beam rotation in that direction;

a plunger and cylinder unit which is fixed at one end and which has the free end of the plunger extending to one of the stop plates on the beam;

said unit containing plunger and reservoir chambers having means to fluid intercommunication, all within the unit, said plunger being reciprocable in the plunger chamber to cause transfer of fluid between the two chambers; and valve means in said fluid means for stopping intercommunication in said unit to hydraulically lock the beam;

the plunger of said unit being single acting and connected at its aforesaid free end to said one stop plate so that upward rotation of the bogie beam at the front places the single acting plunger in compression, said plunger thereby effectively preventing such rotation, but drawing a void in the working chamber to yield therewith and readily move when the bogie beam rotates downwardly at the front.

7. In a vehicle having a forward frame:

work-loadable means supported by the frame so as to carry the load in cantilever manner forwardly thereof;

a pair of wheels arranged with one afront of the other;

a longitudinally disposed bogie beam arranged with the wheels carried by, and disposed one at each of, the opposite ends of the beam;

a trunnion frame, including a crosspiece, on the frame for connecting the beam thereto to rotate on a transverse axis;

a plunger and cylinder unit which is fixed at the cylinder end and which has a free end connected to one of the ends of the beam;

said unit having self-contained and separate plunger and reservoir chambers therein, provided with means of fluid intercommunication within the unit; and valve means in said fluid means for stopping the fluid intercommunication in said unit to hydraulically lock the beam; said fluid contacting one end only of said plunger;

said unit intervening with the plunger constituting the free end connected to said beam, so that upward rotation of the beam at the front places the plunger of the unit in compression, said plunger thereby effectively resisting frontmost wheel jounce, but drawing a a void in the plunger chamber to yield and readily move with the frontmost wheel when such wheel oscillates downwardly.

8. In a loader having a freely rotatable bogie beam:

a loader bucket carried thereby in cantilever relation so as to be located forwardly of the loader;

a front suspension under the loader comprising a longitudinally disposed bogie beam member rotatably supported at a point intermediate its ends by the loader, said member carrying road wheels disposed one at each end so as to be oscillated thereby and including an extreme front road wheel to react the load of the bucket into the ground at the nearest point of suspension to the bucket;

hydraulic cylinder means carried by the loader and including self-contained working chamber and a separate reservoir chamber therein having an intercommunication, and a single acting element in the working chamber and connected to the member to react to upward rotation at the front by causing compression in the chamber in the direction of the fluid;

the element in said working chamber being oscillatable in unison with, and by, the member when it rotates, said element changing the size of the working chamber and thus causing respective ingress and egress of the reservoir fluid in said intercommunication; and valve means in the intercommunication to prevent intercommunication of the fluid, whereby the element hydraulically compresses the fluid in said direction, hydraulically locking the member against upward rotation at the front and thereby hydraulically fixing the location of the extreme front wheel to insure concentration or reacting the bucket load at the ground point nearest the bucket; said fluid contacting one end only of said element, said element drawing a void in the opposite direction from the fluid, affording unresisted beam rotation in the opposite direction and unresisted drop of the extreme front wheel.

9. In a loader having a freely rotatable bogie beam:

a loader bucket carried thereby in cantilever relation so as to be located forwardly of the loader;

a front suspension comprising a freely rotatable bogie beam member pivoted intermediate the ends thereof to the loader, said member carrying road wheels disposed one at each end so as to be oscillated thereby and including an extreme front road wheel to react the load of the bucket into the ground at a point of ground contact nearest the bucket;

hydraulic cylinder means connected as a unit between the loader and the member, and including therein self-contained working and reservoir chambers having an intercommunication;

an element in said working chamber oscillatable in unison with, and by, the rotatable member when it pivots, said element changing the size of the working chamber and causing ingress and egress of reservoir fluid in said intercommunication; and valve means in the intercommunication to prevent said ingress and egress of fluid, thereby hydraulically fixing the location of the extreme front wheel and the ground point to insure that the bucket load is reacted nearest the bucket, said fluid contacting one end only of said element;

said element being single acting to place the working chamber under compression when the extreme front wheel undergoes jounce, thus effective one-way as an hydraulic lock against jounce, but drawing a void in the working chamber to yield and readily move with the rotatable member under force of the relatively rear road wheel, when the front road wheel loses ground engagement and seeks re-engagement to support the bucket load by oscillating groundwardly.

10. A yieldable suspended loader having:

a front suspension wheel and another wheel;

a loader bucket carried by the loader in forwardly cantilevered relation;

a front suspension comprising a longitudinally disposed bogie beam freely rotatably supported at a point intermediate it sends by the loader, and supporting the two wheels with the front one at the front end and the other one at the rearwardly directed end of the beam, the front wheel reacting the load of the bucket into the ground at an optimum point thereon nearest to the bucket;

hydraulic cylinder means carried by the loader and connected to the bogie beam, and including self-contained working and reservoir chambers having an intercommunication;

an element in said working chamber oscillatable in unison with, and by means of, the rotatably supported bogie beam when it rotates, said element changing the size of the working chamber and causing ingress and egress of reservoir fluid in said intercommunication, said fluid contacting one end only of said element; and valve means for controlling said intercommunication having an open valve position affording said ingress and egress freely so that the beam readily oscillates the wheels in opposite directions relative to one another, said valve means having a valve closed position preventing intercommunication of said fluid, whereby the fluid is hydraulically compressed by the element in one direction, hydraulically locking the beam against rotation in that direction and hydraulically fixing the location of the front wheel and the ground point to insure that the bucket load is reacted nearest the bucket, said element drawing a void in the other direction from the fluid, affording unresisted beam rotation in that direction and unresisted drop of the front wheel.

References Cited

UNITED STATES PATENTS

| | | | |
|---|---|---|---|
| 2,393,324 | 1/1946 | Joy | 180—22 X |
| 2,818,311 | 12/1957 | Ashley | 305—10 |
| 2,891,821 | 11/1957 | Mayr | 305—32 X |
| 3,034,237 | 5/1962 | Wolfe | 37—118 X |
| 3,063,510 | 11/1962 | Hunger | 180—9.2 |
| 3,117,800 | 1/1964 | Magnuson | 305—10 |
| 3,142,352 | 7/1964 | Johansson | 180—9.2 X |

OTHER REFERENCES

Pamphlet, UETA, U.S. Army Engineer Research and Development Laboratories, Fort Belvoir, Va.

BENJAMIN HERSH, *Primary Examiner.*

R. J. JOHNSON, *Assistant Examiner.*